United States Patent [19]
Gawlik et al.

[11] 4,236,431
[45] Dec. 2, 1980

[54] MULTIPLE HEAD SLITTER

[75] Inventors: Charles B. Gawlik, Chicago, Ill.; James D. Hall, South Bend, Ind.; Douglas S. Matsunaga, Vernon Hills, Ill.

[73] Assignee: Braner Enterprises, Inc., Schiller Park, Ill.

[21] Appl. No.: 4,351

[22] Filed: Jan. 18, 1979

[51] Int. Cl.³ .......................... B23D 19/06; B26D 1/24
[52] U.S. Cl. ........................................ 83/479; 83/552; 83/551; 83/563; 408/35
[58] Field of Search ................. 83/479, 480, 552, 551, 83/563; 408/35

[56] References Cited

U.S. PATENT DOCUMENTS

| Re. 27,918 | 2/1974 | Montguire | 83/479 |
| 3,727,503 | 4/1973 | Braner et al. | 83/479 |

FOREIGN PATENT DOCUMENTS 2229452 12/1972 Fed. Rep. of Germany ............. 83/479

Primary Examiner—Donald R. Schran
Attorney, Agent, or Firm—Oltsch, Knoblock & Hall

[57] ABSTRACT

A slitter with a plurality of slitter heads mounted on a turntable to allow rotation of the heads. Each slitter head is adapted to be joined to a motor drive by means of an interconnecting arbor end portion which extends from the outboard bearing of the slitting head.

4 Claims, 3 Drawing Figures

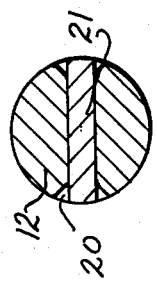
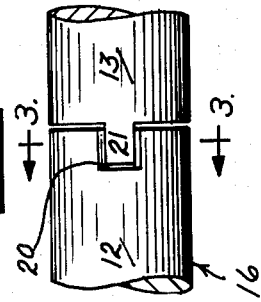
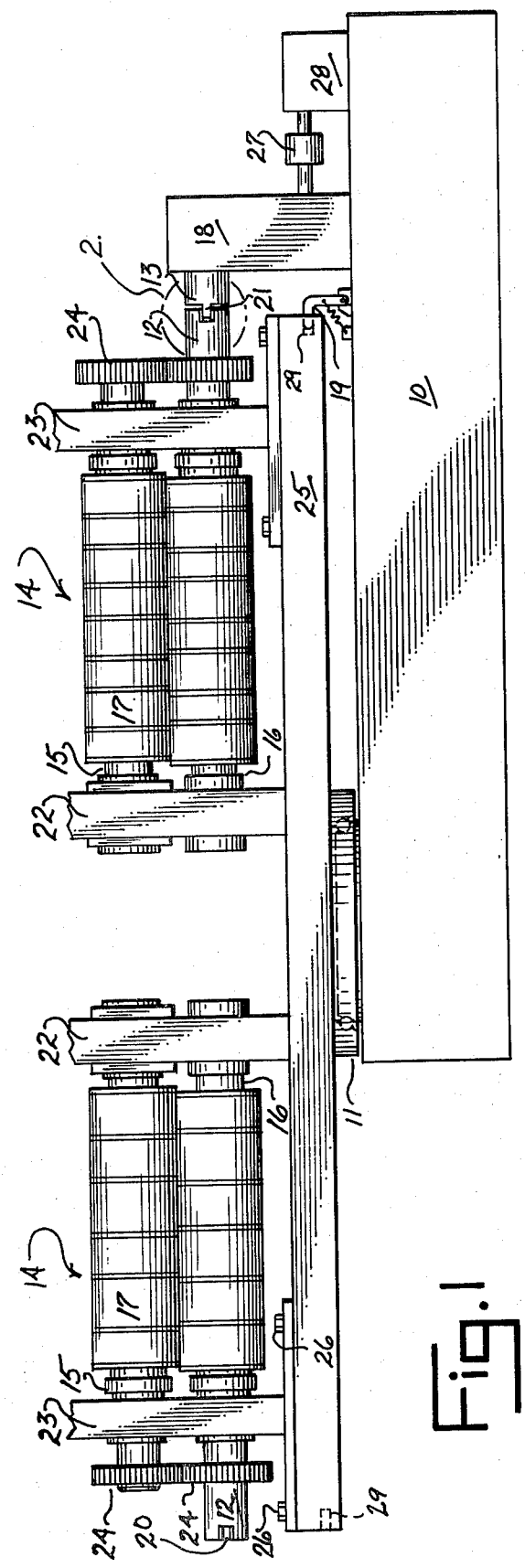

MULTIPLE HEAD SLITTER

SUMMARY OF THE INVENTION

This invention relates generally to a slitter with a plurality of slitter heads carried by a frame and specifically to means of connecting the slitter heads to an arbor driving means.

The slitter includes a frame which carries the slitter heads on a rotatable support. Each slitter head includes a pair of arbors for carrying slitting knives supported between an inboard and an outboard bearing housing. The frame also carries a driving means for rotation of the arbors. At least one of the arbors of each slitter head extends through its outboard bearing housing and is adapted to couple with an extending portion of the driving means to turn the arbor.

When a slitting operation is completed, the slitter head that had been used is disengaged from the driving means and another selected preassembled slitter head is rotated into position and engaged with the driving means.

Accordingly it is the object of this invention to provide a multiple head slitter of simplified operation.

Another object of this invention is to provide a multiple head slitter capable of handling many sizes of sheeting.

It is another object of this invention to provide a means of minimizing deflection of the arbors along the pass line of a multiple headed slitter.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is an elevational view of the slitter.

FIG. 2 is a fragmentary enlarged view of the arbor-drive coupling as seen within broken line 2 of FIG. 1.

FIG. 3 is a cross-sectional view of the coupling through line 3—3 of FIG. 2.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The slitter of FIG. 1 includes a frame 10. Frame 10 carries a support or bed 25 which rotates upon a bearing member 11. Bed 25 supports a plurality of slitter heads 14. The number of heads 14 can vary for a particular size slitter. Each slitter head 14 includes an inboard bearing housing 22 and outboard bearing housing 23 journaling a pair of arbors 15 and 16. Slitter heads 14 are positioned equal radially about the rotational axis of bed 25.

Jack screws (not shown) may be used to vary the spacing between arbors 15 and 16 of each slitter head.

Arbors 15 and 16 extend from its supporting inboard bearing housing 22 to outboard bearing housing 23 with arbor 15 situated over and parallel to arbor 16. Arbor 15 extends through bearing housing 23 and there terminates in an end portion carrying a gear 24. Arbor 16 extends through bearing housing 23 and there terminates in an end portion 12 carrying a gear 24 situated below and intermeshing with gear 24 of arbor 15. End portion 12 of arbor 16 has a transverse slot 20 formed in its end face. Arbors 15 and 16 of slitter heads 14 are adapted to carry cutting assemblies 17 consisting of knives and spacers.

Frame 10 carries a gear box 18. Gear box 18 includes a drive shaft 13 having a tongue part 21 at its end face. Drive shaft 13 is alignable with each arbor 16 of slitter heads 14 upon rotation of bed 25. Motor 28 is connected by a clutch 27 to the drive train within gear box 18.

Upon selection of a preassembled slitter head 14, bed 25 is rotated upon bearing member 11 until the selected slitter head is positioned over the material pass line and its arbor 16 aligned with drive shaft 13. Tongue part 21 of drive shaft 13 fits into slot 20 of the aligned arbor. Bed 25 is secured against rotation by means of a spring biased pivoted anchor pin 19 which extends into predrilled holes 29 in bed 25. This secures drive shaft 13 and aligned arbor 16 in a drive-connected interfit. Arbor 16 may be driven by motor 28 or be free running depending upon clutch actuation.

The multiplicity of slitter heads 14 allow one slitter head to be used while another is being adapted for another cutting operation. Such adaptation can include shifting of the outboard bearing 23 to allow for the slitting of differing widths of metal. Bearing housing 23 is shifted longitudinally along arbors 15 and 16 by loosening and repositioning the bolts 26 which anchor the housing to bed 25.

As one alternative construction, drive shaft 13 may carry a keyed sleeve which would slide over and lock with end portion 12 of arbor 16. This would remove the need for anchor pin 19. The sleeve would serve the double function of driving aligned arbor 16 and anchoring the slitter bed against rotation.

It is to be understood that the invention is not to be limited to details herein given but may be modified within the scope of the appended claims.

What we claim is:

1. A multiple head slitter having a material pass line and including a frame, a plurality of slitter heads, each slitter head including a pair or arbors, means carried by said frame for supporting said slitter heads for rotation about a common vertical axis with the arbors of the slitter heads passing in a generally horizontal plane, each slitter head including an inboard bearing housing located adjacent said axis of rotation and an outboard bearing housing spaced generally radially relative to said axis from said inboard bearing housing with said pair of arbors thereof journaled between said housings, whereby a selected slitter head can be positioned with its pair of arbors extending across said material pass line, the improvement wherein said one arbor of the selected slitter head includes an extending end portion projecting outwardly from one of said outboard bearing housing and inboard bearing housing of the slitter head, driving means carried by said frame for rotating said one arbor when engaged with said extending end portion thereof, one of said arbor extending end portion and said driving means including a projecting part means for fitting in rotating locking engagement into said slotted part, said driving means being fixedly located relative to said axis of rotation of the slitter heads wherein upon rotation of the slitter heads about the axis of rotation said projecting part means will be fitted into said slotted part at alignment of said arbor extended end portion with the driving means to permit the driving means to rotate said arbor extended end portion and the arbor thereof.

2. The multiple head slitter of claim 1 and anchoring means for preventing rotational movement of said slitter heads about said axis of rotation when said arbor extending end portion and driving means are engaged.

3. The multiple head slitter of claim 1 wherein at least one arbor of each slitter head includes a said arbor extending end portion, each arbor extending end portion projecting outwardly from the outboard bearing housing of the slitter head and being adapted to engage said driving means when aligned therewith upon rotation of said slitter heads about said axis of rotation.

4. The multiple head slitter of claim 3 wherein the outboard bearing housing of each slitter head is shiftable to vary the spacing between bearing housings of the slitter head while journaling its pair of arbors.

* * * * *